United States Patent [19]

Reeve et al.

[11] Patent Number: 4,796,970
[45] Date of Patent: Jan. 10, 1989

[54] OPTICAL FIBRE TRANSMISSION LINES

[75] Inventors: Michael H. Reeve; Stephen A. Cassidy, both of Ipswich, England

[73] Assignee: British Telecommunications plc, London, England

[21] Appl. No.: 15,113

[22] Filed: Feb. 13, 1987

Related U.S. Application Data

[60] Division of Ser. No. 848,950, Apr. 7, 1986, Pat. No. 4,691,896, which is a continuation of Ser. No. 551,640, Nov. 8, 1983.

[30] Foreign Application Priority Data

Nov. 8, 1982 [GB] United Kingdom ................ 8231840
Apr. 8, 1983 [GB] United Kingdom ................ 8309671

[51] Int. Cl.⁴ .......................... G02B 6/44; G02B 6/00; G02B 6/04
[52] U.S. Cl. ............................ 350/96.23; 350/96.10; 350/96.24
[58] Field of Search ............... 350/96.10, 96.23, 96.24

[56] References Cited

U.S. PATENT DOCUMENTS

| | | | |
|---|---|---|---|
| 3,610,582 | 10/1971 | Passoni | 254/134.3 FT |
| 3,793,732 | 2/1974 | Hamrick | 254/134.4 |
| 4,082,423 | 4/1978 | Glista et al. | 350/96.23 |
| 4,105,284 | 8/1978 | Olshansky | 350/96.33 |
| 4,181,403 | 1/1980 | Macedo et al. | 350/96.33 |
| 4,185,809 | 1/1980 | Jonnes | 254/134.4 |
| 4,230,395 | 10/1980 | Dean et al. | 350/96.23 |
| 4,248,035 | 2/1981 | Skillen et al. | 350/96.23 |
| 4,332,436 | 6/1982 | Adorni et al. | 350/96.23 |
| 4,372,792 | 2/1983 | Dey et al. | 350/96.23 |
| 4,408,378 | 10/1983 | Ketteringham et al. | 28/289 |
| 4,414,942 | 3/1979 | Anderson | 123/339 |
| 4,446,686 | 5/1984 | Panuska et al. | 350/96.23 |
| 4,552,433 | 11/1985 | Titchmarsh et al. | 350/96.23 |
| 4,640,576 | 2/1987 | Eastwood et al. | 350/96.23 |
| 4,659,174 | 4/1987 | Ditscheid et al. | 350/96.23 |
| 4,691,896 | 9/1987 | Reeve et al. | 254/134.4 |

FOREIGN PATENT DOCUMENTS

| | | |
|---|---|---|
| 0108590 | 8/1982 | European Pat. Off. . |
| 2507583 | 2/1975 | Fed. Rep. of Germany . |
| 3000109 | 7/1980 | Fed. Rep. of Germany . |
| 1511615 | 5/1978 | United Kingdom . |
| 2081764 | 2/1982 | United Kingdom . |
| 2086607 | 5/1982 | United Kingdom . |
| 2122367 | 1/1984 | United Kingdom . |
| 2122370 | 1/1984 | United Kingdom . |

OTHER PUBLICATIONS

"Single-Ended Fiber Strain & Length Measurement on Frequency Domain", by Kashyap and Reeve, Electronic Letters, vol. 16, No. 18, Aug. 1980.
"Temperature Desensitisation of Delay in Optical Fibers for Sensor Applications" by Kashyap et al, Electronics Letters, vol. 19, No. 34, Nov. 1983.
"Optical Fibre Jacketed with Electronics Lett", vol. 19, No. 17, 8/83, pp. 674-675, Yamamoto et al.
"High Quality Optical Fibre Cable for Telecommunication", Conf. 27th Int. Wire & Cable Sym., Cherry Hill, N.J. 11/78, pp., 394-403 by Pizzorno.
"Principles of Fiber-Optical Cable Design", IEEE vol. 123, No. 6, Jun. 1976, pp. 597-602 by Foord et al.
Hu et al, "Subducts: The Answer to Honolulu's Growing Pains", Apr. 7, 1980, pp. 23-35.

Primary Examiner—William L. Sikes
Assistant Examiner—Akm E. Ullah
Attorney, Agent, or Firm—Nixon & Vanderhye

[57] ABSTRACT

An optical fibre transmission line is installed by first installing a conduit having one or more bores and subsequently inserting flexible, lightweight optical fibre members containing the optical fibres into the bores.

The optical fibre members are propelled by employing the fluid drag of air, or another suitable gas, passed at high velocity through the bores.

22 Claims, 3 Drawing Sheets

OPTICAL FIBRE TRANSMISSION LINES

This is a division of application Ser. No. 848,950, filed Apr. 7, 1986, which is a file wrapper continuation of Ser. No. 551,640, filed Nov. 8, 1983.

This invention relates to optical fibre transmission lines, and in particular though not exclusively to methods, apparatus, and cable structures for their installation.

Optical fibre cables carrying optical fibre transmission lines have heretofore been installed by the same methods as conventional metal conductor cables, those methods usually involving pulling the cable with a pulling rope through a previously laid cable duct. Frequently the cable duct already contains one or more conventional cables at the time of installing the optical fibre cable.

Unlike the metal conductors of a conventional cable, the optical fibres are easily damaged by tensile stress. Such stress may, for example, propagate micro-cracks, leading to fibre breakage in the long term. It is, therefore, standard practice to reinforce optical fibre cables by providing a central strength member, usually one or more steel tension wires, about which the optical fibres are disposed. The strength member takes up, and thus increases the ability of the cable to withstand, tensile stresses accompanying installation of the cable.

Unfortunately, the central strength member usually provides insufficient protection against local stresses caused by pulling a further cable through the same duct. The conventional approach of installing at the outset optical fibre cables containing sufficiently large numbers of optical fibres to satisfy foreseeable future traffic demands is a way of overcoming this problem. In consequence, first time installation of optical fibre cables containing dozens or even hundreds of optical fibres are currently envisaged despite the fact that to begin with a small fraction of the installed fibres would provide ample traffic carrying capacity. A further reason for installing optical fibre cables of comparatively large dimension is that the smaller the cross-section of the cable the more prone the cable becomes to wedging in between those cables already present in the duct.

The first time installation of large diameter optical fibre cables with high numbers of optical fibres, is, however, undesirable for a variety of reasons. Firstly, there are problems of a technical nature inherent in such cables, such as for example the difficulty of forming joints and of achieving the required high strength-to-weight ratios. Secondly, there are clear economical drawbacks in committing large resources to install initially unused fibre capacity, particularly in view of the comparatively recent origins of optical fibre technology which lead one to expect continued substantial reductions in the price and improvement in the quality of optical fibres. Thirdly, there is the serious risk of damaging in a single incident very large numbers of expensive optical fibres and, finally, there is an appreciable loss in flexibility when routing high density optical fibre transmission lines.

A method of installing optical fibres with pulling ropes and pull chords is described in "Sub-ducts: The Answer to Honolulu's Growing Pains", Herman S L Hu and Ronald T Miyahara, Telephony, Apr. 7, 1980, pp 23 to 35. The intallation method described there proceeds as follows: A section of existing 4-inch (100 mm) duct is rodded and thereafter between one and three individual 1-inch (25 mm) polyethylene tubes are inserted into the duct using pulling ropes. The polyethylene tubes form sub-ducts into which an optical fibre cable can be pulled with the aid of a nylon pull chord which has previously been inserted into the sub-duct by means of a parachute attached to its leading end and pushed through the subduct with compressed air.

The method just referred to does deal with some of the problems discussed above, but only to a very limited extent. Thus, it enables fibre capacity to be increased in up to three stages, and separates the optical fibre cables from those cables already in the duct, thereby greatly reducing the liklihood of jamming, and hence overstressing, of the optical fibre cable.

It is an object of the present invention to overcome, or at least appreciably mitigate the majority of the aforementioned problems of installing optical fibre transmission lines.

It is another object to provide a method of installing optical fibre transmission lines which is comparatively simple and yet flexible and economical According to the present invention a method of advancing a lightweight and flexible optical fibre member along a tubular pathway comprises propelling the fibre member along the pathway by fluid drag of a gaseous medium passed through the pathway in the desired direction of advance.

It will be appreciated that to generate sufficient fluid drag to propel the fibre member, the gaseous medium has to be passed through the pathway with a flow velocity much higher than the desired rate of advance.

The terms "lightweight and flexible" in respect of the optical fibre member are to be understood as meaning "sufficiently lightweight and flexible" for the fibre member to be propelled by the fluid drag.

Whether the fibre member is sufficiently lightweight and flexible and the flow velocity sufficiently high is readily determinable by a simple trial and error experiment, guided, if necessary, by the theoretical model discussed below.

The flow velocity of the gaseous medium may be steady or may be suitably varied, for example either between a first velocity producing no, or insufficient, fluid drag to propel the fibre member, and a second velocity producing sufficient fluid drag to propel the fibre member, or between a first and a second velocity both producing sufficient fluid drag for propelling the fibre member. Conveniently the variations in velocity take the form of repeated abrupt changes between the first and second velocity.

The aforementioned variations in flow velocity may include periods during which the flow is reversed with respect to the desired direction of advance of the fibre member.

It is to be understood that more than one fibre member may be propelled along the same tubular pathway.

A fibre member may, for example, comprise a single optical fibre, protected by at least a primary coating but preferably contained within an outer envelope. Alternatively, a fibre member may comprise a plurality of optical fibres contained within a common envelope.

The envelope may be loosely or tightly surrounding the fibre or fibres.

The method may be used for insertion of an optical fibre member into, or its withdrawal, from the pathway.

The gaseous medium is chosen to be compatible with the environment in which the invention is performed, and in ordinary environments will be a non-hazardous gas or gas mixture.

With the provision about compatibility with the environment, the gaseous medium is preferably air or nitrogen.

The tubular pathways and/or the fibre members are conveniently but not necessarily of circular cross-section, and the fibre member is always smaller than the pathway.

In practice the pathway internal diameter will generally be greater, and frequently much greater than 1 mm, and the external diameter of the fibre member greater than 0.5 mm.

A preferred range of diameters for the pathway is 1 to 10 mm, conveniently between 3 and 7 mm, and a preferred range of diameters for the fibre members is 1 to 4 mm, although much larger diameters may be used provided the fibre member is sufficiently lightweight and flexible. The diameter of the fibre members is preferably chosen to be greater than one tenth, and conveniently to be about one half of the pathway or greater (and appropriately less, of course, if more than one fibre member is to be propelled through the same pathway).

Insertion of a fibre member by means of the fluid drag of a gas passing over the fibre member has several advantages over methods involving pulling an optical fibre cable with a pull cord.

Firstly, the extra step of providing a pull cord is elimated.

Secondly, using the fluid drag of a gaseous medium produces a distributed pulling force on the fibre member. This is particularly advantageous if the installation route contains one or more bends. If, as would be the case with a pulling cord, the pulling force were concentrated at the leading end of the fibre member, any deviation of the pathway from a straight line would greatly increase friction between the fibre member and the internal walls of the pathway, and only a few bends would be sufficient to cause locking of the fibre member. The distributed pulling force produced by the fluid drag, on the other hand, enables bends to be negotiated fairly easily, and the number of bends in a given installation is no longer of much significance.

Thirdly, the fluid drag substantially reduces overall pulling stress on the fibre member and so permits the fibre member to be of relatively simple and cheap construction.

Furthermore, because the fibre member is not subjected to any substantial pulling stress during installation, little allowance, if any, needs to be made for subsequent relaxation.

According to a further aspect of the present invention, a method of installing an optical fibre transmission line comprises installing a conduit having one or more ductlets providing tubular pathways and, after installation of the conduit, inserting by the aforesaid method using fluid drag one or more fibre members into the associated ductlets as required.

Installing optical fibre transmission lines by this method has several advantages over conventional techniques.

Firstly, since the conduit is installed without containing any optical fibres, conventional rope pulling and similar techniques may be freely employed for installing the conduit.

Secondly, the capacity of a transmission line can readily be adapted to requirements. Thus, while initially only one or two fibre members may be sufficient to carry the traffic the conduit may contain a much larger number of ductlets than are required at the time of installation, and further fibre members may be inserted later on as and when needed. The conduit of the present invention is cheap compared to the cost of the fibres, and spare ductlets to accommodate further fibres and when extra capacity is required can thus be readily incorporated without adding more than a small fraction to overall costs.

The method of the present invention also permits the installation of improved later generations of optical fibre transmission lines. It is possible, for example, to install at first one or more fibre members incorporating multimode fibres, and at a later date add, or replace the installed multimode fibre members with fibre members incorporating monomode fibres. Installed fibre members may conveniently be withdrawn from the ductlet, and replacement fibre members be inserted by using the aforesaid method of propelling by fluid drag of a gaseous medium.

According to yet another aspect of the present invention, an optical fibre cable comprises a conduit including one or more ductlets forming tubular pathways and capable of loosely accommodating an optical fibre member, and at least one optical fibre member inserted by the aforementioned method using fluid drag.

The conduit may be rigid or flexible.

Where the conduit includes more than one ductlet, the ductlets are conveniently formed by bores in the material of the conduit. The term "bore", like the word "tubular" is understood in this context to include circular and other suitable shapes of cross-sectional area.

Alternatively, the conduit may comprise a plurality of individual tubes enveloped by a common outer sheath.

It will be appreciated that the present invention largely avoids the risk, inherent in handling optical fibre cables with a large number of fibres, of accidentally damaging before or during installation in a single event a large number of expensive optical fibres.

The present invention also enables the installation of continuous optical fibres over several installation lengths without joints.

Furthermore, individual fibre members routed through the conduit can be routed, without requiring fibre joints, into different branch conduits at junction points.

The present invention will now be explained further by way of example and with reference to the accompanying drawings of which:

Figure 1:
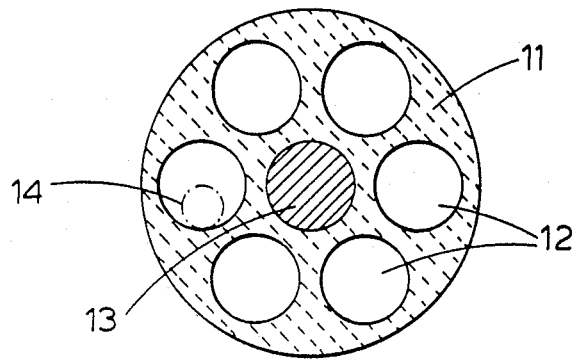
FIG. 1 is a cross section through a conduit suitable for implementing the invention.

Referring first to the FIG. 1, there is shown a conduit 11 incorporating six ductlets 12, one of which contains a fibre member 14, and a core 13.

The conduit 11 is made of extruded polymer or other suitable material, the ductlets, or bores, 12 being formed in the conduit during its extrusion. The central core 13 contains copper wire pairs required for testing operations during and after installation, repeater supervision, power supply, and the like. Alternatively, or additionally, the core 13 may incorporate reinforcements, for example tension wires, to take up the tension forces during installation of the conduit.

Where required, the conduit may be surrounded by a water barrier (not shown).

The copper wire pair for testing can be omitted from the core 13 if suitable alternative testing facilities are available, such as, for example testing methods using optical fibres inserted subsequently into the conduit as described below.

Figure 2:
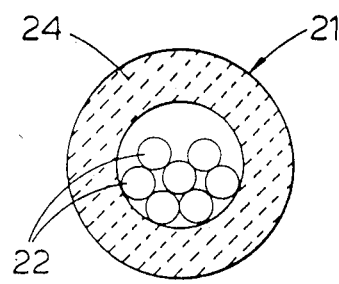
FIGS. 2 and 3 are relatively enlarged cross-sections through fibre members.

FIG. 2 is a cross-section through a fibre member 21 which is in a form particularly suited for installation by fluid drag. The fibre member 21 comprises several optical fibres 22 lying loosely in a polymer sheath 23. In view of the virtual absence of any pulling stress during installation of a fibre member by fluid drag, the fibre member 21 does not require reinforcement. The relatively simple construction also leads to lower production costs, as well as making the fibre member 21 comparatively light, thereby enabling easy installation by fluid drag.

Figure 3:
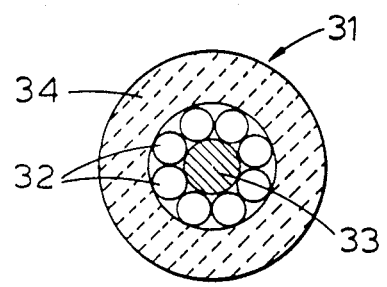

In certain circumstances it may be desirable to provide a reinforced fibre member, and FIG. 3 is a cross-section through such a fibre member 31 which, provided it is made light enough and flexible enough, is suitable for insertion by fluid drag into a ductlet 12 of the conduit 11 of FIG. 1. The fibre member 31 consists of a plurality of optical fibres 32 arranged round a strength member 33 and enclosed in a polymer sheath 34.

The installation of an optical transmission line proceeds as follows:

The flexible conduit 11 is installed into an existing duct (not shown) by conventional methods such as pulling with a pulling rope.

Because the conduit 11 does not contain any optical fibres at this stage, the conduit 11 can be handled in the same way as an ordinary cable, and no special care needs to be taken over and above that customary in installing conventional metal conductor cables. If required, it is also possible at this stage, that is before the conduit contains any optical fibres, to pull a further conduit through the duct to provide spare capacity.

Furthermore, since the conduit can readily be made of an external diameter matching that of cables already in the duct, wedging is less likely to occur than with a standard, smaller diameter optical fibre cable.

Once installed, optical fibre members such as 21 and 31 shown in FIGS. 2 or 3 are inserted into as many of the ductlets 12 as is required.

Instead of the afore-described fibre members 21 and 31 of near circular cross-section, the fibre members may, for example, be so-called ribbons, in which a thin, wide sheath encloses an optical fibre or a plurality of optical fibres lying in the same plane.

Manufacture of the conduit 11 is cheap compared to the optical fibres in the fibre members 21 or 31 which it is designed to carry, and spare ductlets 12 for future expansion can readily be incorporated at the extrusion stage of the conduit 11 without adding unduly to the overall cost. The conduit may be manufactured by adapting conventional cable manufacturing processes such as, for example, extrusion.

A gas flowing past the surface of a solid object produces a drag force which largely depends on the velocity of the gas relative to the surface. The Applicants have found that this drag force can be made sufficiently large to pull a lightweight optical fibre member 21, or 31 into a tubular pathway such as, for example, a ductlet 12 of the aforementioned conduit 11.

In experiments, the flow velocity, or the flow rate, of air through a given pathway has been found to depend approximately linearly on the pressure difference between opposite ends of the pathway, with the slope of the dependency indicating that flow at useful flow rates is predominantly turbulent.

For a given pressure difference, the flow rate varies with the size of the free cross sectional area of the bore, while the drag force on a fibre member present in a bore varies with the flow rate and the surface area of the fibre member. The drag force has been optimised in experiments by varying these parameters and, in particular, by choosing an appropriate ratio of bore diameter to fibre member diameter.

Experiments have been performed using a bore diameter of 7 mm. The optimum fibre member diameter for this bore size has been found to lie between 2.5 and 4 mm. A pressure below 80 p.s.i. (approximately 5.6 kgs/cm$^2$), usually about 40 p.s.i. has been found sufficient to insert fibre members of up to 3.5 gram per meter (gr/m) over lengths of 200 meters. A fibre member with 2 gr/m is easily installed over this length.

The theoretical value for the drag forces for these dimensions has been calculated in the manner described below with reference to FIG. 6 to be 2.5 gr/m. Lower practical values are believed to be due to the tendency of the fibre members 21, 31 to acquire "set" while on the supply reel. This set would appear to force the fibre member 21, 31 against the wall of the bore 12, thereby increasing friction.

Suitable texturing or shaping of the fibre member surface may lead to drag forces higher than those presently experienced.

It should be noted here that using fluid drag to insert fibre members into tubular pathways differs significantly from the method described in the above mentioned article of inserting pull cords by means of parachutes. The parachute is propelled by the pressure difference between the air in front of and the air behind the parachute, and the velocity of the air relative to the advancing cord is only minimal and the pulling force is localised at the point of attachment of the parachute. In contrast, using fluid drag requires a relatively high flow of fluid relative to the surface of the fibre members.

Also, unlike the use of parachutes or potential other methods of inserting fibre members into the tubular pathways, using fluid drag produces a uniformly distributed pulling force on the fibre member. This reduces the strain on the optical fibres within the fibre member to very low values.

In ordinarily pulling a fibre member through a bend enclosing an angle $\theta$, the tension of the leading end, $T_2$ is related to the tension $T_1$ at the trailing end $T_2/T_1 = e^{\mu\theta}$ where $\mu$ is the coefficient of friction. Even a small number of bends in the pathway may therefore result in an unacceptably high force being required at the leading end if locking of the fibre member is to be avoided. In contrast, the distributed pulling force produced by fluid drag is applied evenly along the fibre member, including in bends, and permits a large number of bends to be easily and speedily negotiated without any undue stress on the fibre member.

Figure 4:
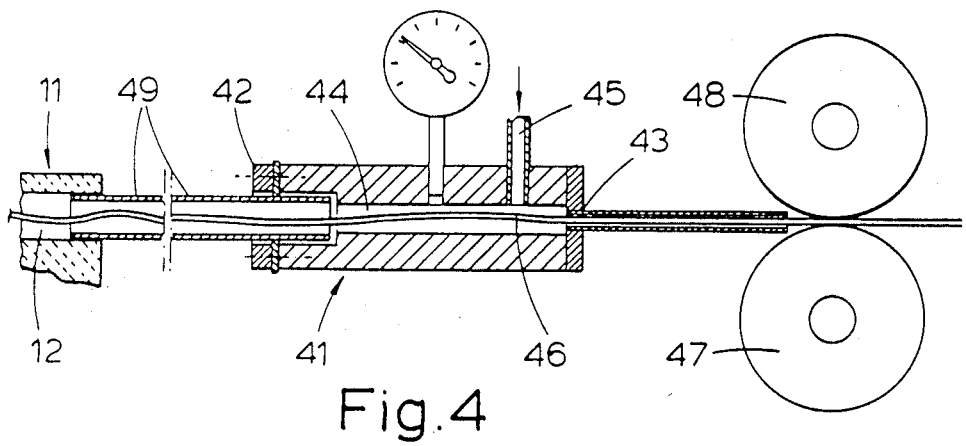
FIG. 4 is a schematic diagram of apparatus for inserting fibre members into ductlets by fluid drag.

FIG. 4 illustrates apparatus for feeding fibre members into tubular pathways such as the ductlets 12 of the conduit 11 of FIG. 1. The apparatus consists of a feedhead 41 which contains a straight bore 44 connected at one end, its outlet end 42, to a flexible tube 49, and at the other end, its inlet end 43, to a supply reel (not shown). The head 41 also contains an inlet 45 for air. The outlet end 42 and the bore 44 are substantially larger in cross sectional area than fibre member 46. The aperture of the inlet end 43 is only slightly larger in cross sectional area than that of the fibre member 46. This arrangements forms an air block which presents a relatively large flow resistance to air and helps prevent air escaping through the inlet duct 43. The tube 49 is inserted into one of the ductlets of the conduit 11. Suitable seals between the feedhead 41 and the tube 49, and the tube 49 and the ductlet 12 prevent undesirable escape of the air.

In use the fibre member 46 is fed into the inlet end 43 of the feedhead 41 by means of a pair of rubber drive wheels 47 and 48, driven by a constant torque driving mechanism (not shown). Air is fed into the bore 44 through the air inlet 45 and hence is directed through the tube 49 into the ductlet 12. The optical fibre member 46 is pushed through the inlet end 43 of the feedhead into the bore 44 and onwards into the tube 49. Pushing of the fibre member 46 continues until the surface area of the fibre member which is exposed to the air flow is sufficiently large to produce a drag force to cause the further advance of the fibre member 46 through the tube 49 and the ductlet 12, while the rate of feed is controlled by means of the aforementioned rubber drive wheels 47 and 48.

Figure 5:
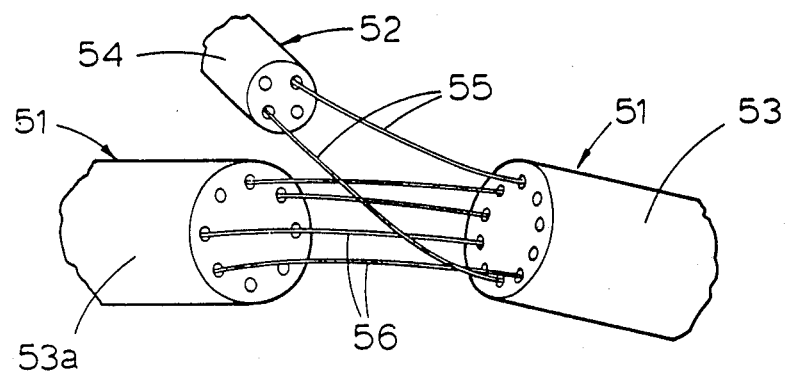
FIG. 5 is a schematic drawing of a junction between a trunk and a branch conduit.

FIG. 5 shows a branching connection between an optical fibre trunk line 51 and a branch line 52, each comprising a conduit 53 and 54 respectively and one or more fibre members 55 and 56. Since, as described above, the fibre members are individually inserted into the ductlets of the trunkline conduit 53, individual fibre members 55 can be routed from the trunk conduit 53 into the branch conduit 54 as required, while other fibre members 56 continue to the adjacent section 53a of the trunkline conduit.

Figure 6:
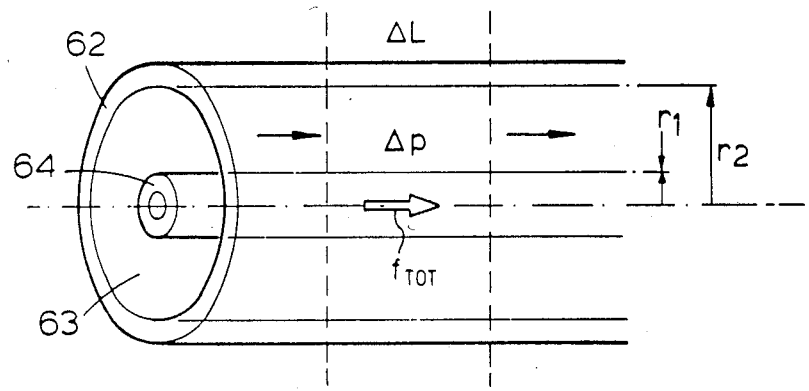
FIG. 6 is a schematic diagram to illustrate notation used in drag force calculations.

Referring now also to FIG. 6, the drag force on the fibre member 64 within the bore 63 of a ductlet, or tube, 62 on account of turbulent air flow through the bore 63 can be calculated as discussed below.

These calculations show that what has been called fluid drag or drag force above is, in fact, a composite force, of which the major proportion is normally due to viscous drag, and at least one other important component due to a hydrostatic force, f' below. It will be appreciated that the exact composition of the drag force does not affect the principles of the invention but the more detailed analysis below can be used to optimise the parameters involved in carrying out the invention, and to obtain some guidance for trial and error experiments.

The pressure difference between the tube ends can be equated to a shear force distributed over the inner surface of the bore 63 and the outer surface of the fibre member 64. Thus, one has, for a small element of length $\Delta l$ producing a pressure drop $\Delta p$ $$\Delta p \pi (r_2^2 - r_1^2) = F \tag{1}$$

where $r_2$ = outer tube bore radius, $r_1$ = inner tube radius and F is the viscous drag force on the inner and outer walls of the elemental length.

If is it now assumed that the force F is distributed evenly over the area of the inner and outer walls, that is to say the external wall of the fibre member and the internal wall of the ductlet respectively, the drag force, f, on the fibre member per unit length is:

$$f = \frac{F}{\Delta l} \left[ \frac{2\pi r_1}{2\pi(r_1 + r_2)} \right] = \frac{\Delta p}{\Delta L} \pi r_1 (r_2 - r_1) \tag{2}$$

which gives, in the limit, the drag force on the fibre member per unit length, $$f = \pi r_1 (r_2 - r_1) \frac{dp}{dl} \tag{3}$$

In addition, we must consider the force produced by the pressure difference acting on the cross-sectional area of the fibre member. This is locally proportional to the pressure gradient and therefore is distributed over the installed length of the fibre member in the same way as the viscous drag force, leading to an additional force $$f' = \frac{\Delta p}{\Delta l} \pi r_1^2 \tag{4}$$

giving a total force per unit length of $$f_{TOT} = \frac{dp}{dt} \pi r_1 r_2 \tag{5}$$

Figure 8:
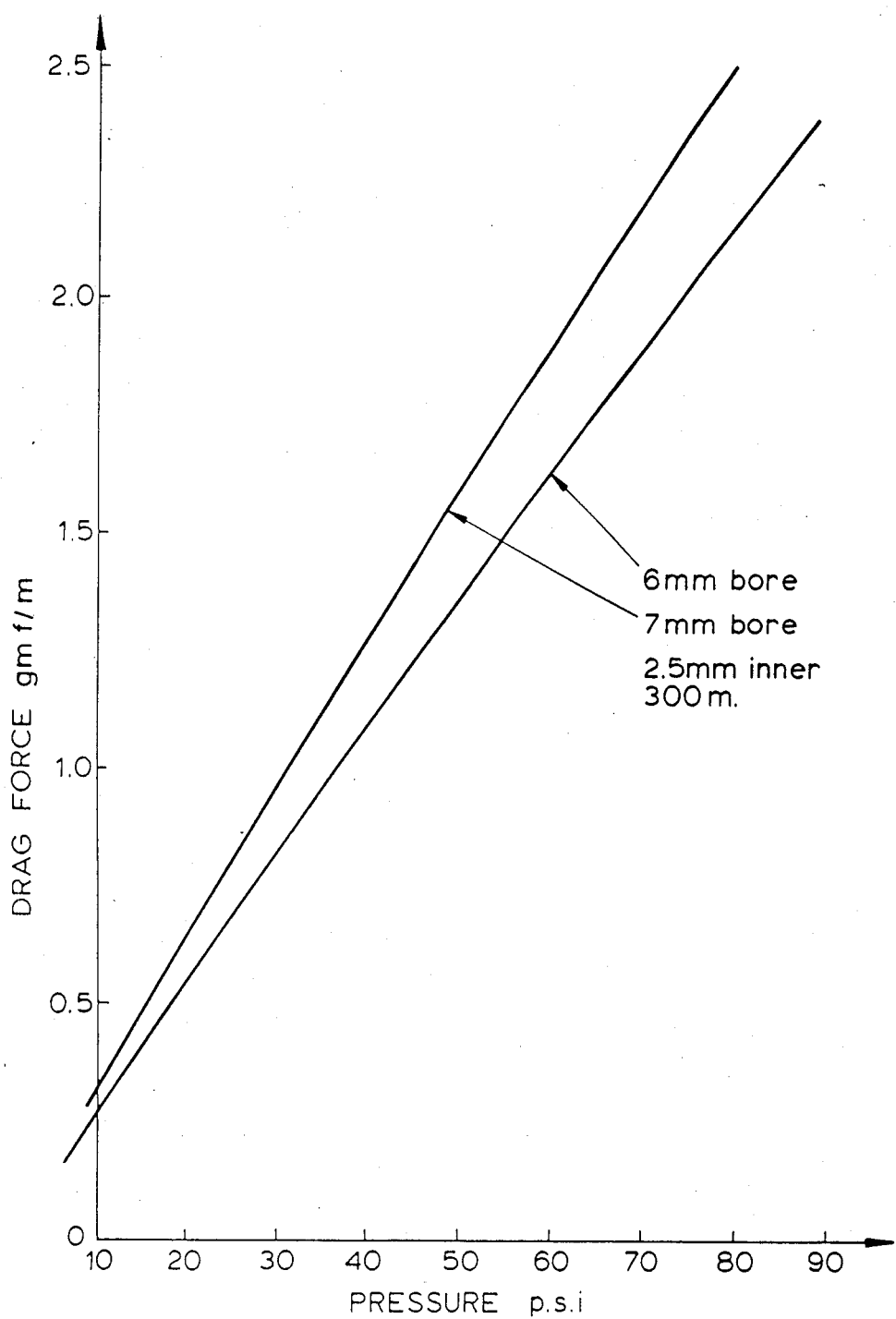
FIG. 8 is a graph of drag force vs pressure.

In order to get an initial estimate of this it is assumed that the pressure drops linearly over the length of the bore, whether filled by fibre member or not. Equation 5 is then plotted, for the case of the 6 mm bore diameter with 2.5 mm O.D. fibre member, in FIG. 8, for a length of 300 m. Since pressure is normally quoted in psi it has been retained here for the sake of convenience.

Coefficients of friction of around 0.5 have been measured for the polyethylene and polypropylene fibre members against a polyethylene bore wall. Therefore, with a fibre member weighing 3 gms/m we could expect to install a 300 m length with around 55 psi pressure. Any extra drag force over that required to overcome friction would appear at the start end as a gradually increasing tension in the fibre member as installation proceeds.

Figure 7:
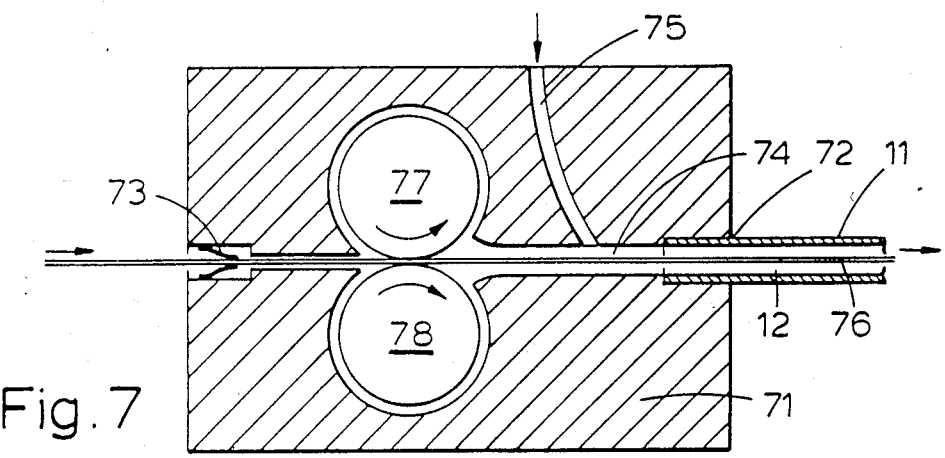
FIG. 7 is a schematic section of a modified drive unit.

FIG. 7 shows in diagrammatic form the arrangement of the modified drive unit discussed with reference to FIG. 4, in which the only major change lies in incorporating the drive wheels 77 and 78 within the feedhead 71.

As the foregoing discussion with reference to FIG. 6 has illustrated, the viscous drag force is accompanied by a hydrostatic force, the force f' of equation 5 above. This force f' has been found to oppose the insertion of the fibre member into the drive unit, making the incorporation of the drive wheels 77 and 78 into the drive unit preferable. The force f', referred above as the hydrostatic potential must be overcome when introducing the fibre member into the pressurised areas. The drive wheels would be driven by a torque just sufficient to overcome this potential.

The drive wheels are incorporated into the pressurised cavity 74 and thus the force on the fibre member necessary to overcome the hydrostatic potential is tensile. If the wheels were outside the drive unit, this force would be compressive, and there would be tendency for the fibre member to buckle.

For convenience the drive unit may be made to split along the fibre member axis, and perpendicular to the diagram, or in some other plane. The air seals 72, 73 may be, for example, rubber lips, or narrow channels.

In operation, a fibre member 76 fed into the drive unit would be automatically taken up by the drive wheels with just enough force to overcome the hydrostatic potential, and fed on along the ductlet 12. The fluid drag of the air flowing down the ductlet 12 causes the fibre member 76 to be pulled along the ductlet 12 as the installation proceeds. This means that such a drive unit can be placed between two adjoining sections of conduit so that a fibre member emerging from a ductlet in the first conduit can be fed into the appropriate ductlet of the second. Thus, an installation could consist of a fibre member 76 running through a number of conduits using two or more drive units in tandem, possibly without supervision.

It will be appreciated that it is possible to blow compounds in liquid or powder form along the ductlet prior to, or during installation in order to provide lubrication for the fibre members. Powdered talc is an example of a suitable lubricant.

The ductlets may, for example, also be formed in a power cable, or in a conventional subscriber line, to allow subsequent installation of optical fibre members. In the latter case, to avoid ingress of water, the ductlet may be sealed until the time of installation of the fibre members.

We claim:

1. An optical fibre cable structure of extended length L comprising:
   a conduit having one or more tubular ductlets of length L disposed therewithin and said ductlets having openings only at either end of said length L and being capable of loosely accommodating at least one optical fibre member, and
   at least one optical fibre member inserted into and through an associated ductlet by propelling the fibre member from one end to the other of said ductlet using fluid drag of a gaseous medium distributed along the inserted length of said fibre member.

2. A structure as in claim 1 wherein the conduit is flexible.

3. A structure as in claim 1 or claim 2 wherein the fibre member comprises a plurality of optical fibres contained in a common envelope.

4. A structure as in claim 1 wherein the fibre member contains at least one single mode optical fibre.

5. A structure as in claim 1 wherein the ductlets have a diameter greater than 1 mm and the fibre member or fibre members have a diameter greater than 0.5 mm.

6. A structure as claimed in claim 1 wherein the ductlets have a diameter of between 1 mm and 10 mm.

7. An optical fibre cable structure of extended length L produced by the method of:
   advancing a lightweight and flexible optical fibre member into, along and through a tubular pathway of length L open substantially only at its opposite ends by propelling the fibre member along the pathway from one end to the other over said length L by fluid drag of a gaseous medium passed through the pathway in the desired direction of advance at a velocity substantially greater than the velocity at which said fibre member is moved therethrough, to provide a conduit having at least one tubular ductlet of length L forming said tubular pathway and loosely accommodating an optical fibre member contained therein.

8. A structure as in claim 7, wherein the conduit is flexible.

9. A structure as in claim 7 or 8 wherein the fibre member comprises a plurality of optical fibres contained in a common envelope.

10. A structure as in claim 7, wherein the fibre member contains at least one single mode optical fibre.

11. A structure as in claim 7, wherein the ductlets have a diameter greater than 1 mm and the fibre member or fibre members have a diameter greater than 0.5 mm.

12. A structure as in claim 11, wherein the ductlets have a diameter of between 1 mm and 10 mm.

13. A structure as in claim 7, wherein said conduit includes a plurality of bends therewithin at the time the optical fibre is propelled along said ductlet.

14. An optical fibre member of extended length greater than L comprising one or more optical fibres contained in an outer envelope characterized in that said fibre member is sufficiently lightweight and flexible to be propellable from one end along and through a tubular pathway of length L substantially closed except at opposite ends thereof by fluid drag of a gaseous medium passing over the fibre member at a high average relative flow velocity.

15. An optical fibre member according to claim 14, wherein the outer envelope comprises a polymer.

16. An optical fibre member according to claim 15, wherein the polymer comprises polyethylene or polypropylene.

17. An optical fibre member according to claim 14, wherein the outer envelope has an outer surface textured or shaped to increase the fluid drag.

18. An optical fibre cable structure comprising at least one optical fibre member according to claim 14.

19. An optical fibre member extending a considerable distance between two points comprising one or more optical fibres contained in an outer envelope characterized in that said fibre member is sufficiently lightweight and flexible to be propellable along a tubular pathway by fluid drag of a gaseous medium passing over the fibre member at a high average relative flow velocity,
   said optical fibre member having a weight of not more than 3.5 gm/m.

20. An optical fibre member extending a considerable distance between two points comprising one or more optical fibres contained in an outer envelope characterized in that said fibre member is sufficiently lightweight and flexible to be propellable along a tubular pathway by fluid drag of a gaseous medium passing over the fibre member at a high average relative flow velocity,
   said optical fibre member having a diameter ($2r_1$) in the range from 1 to 4 mm.

21. A blown fibre optic cable constructed in situ between two points separated by distance L of substantially more than one meter, said cable comprising:
   a tubular conduit disposed between said two points and substantially closed except at two corresponding end points of the conduit; and an optical fibre member extending through the entire length of said conduit and installed therealong using primarily drag forces generated and distributed along the installed length of fibre member by gases passing thereby, in situ, from one end of said conduit to the other relative to the fibre member.

22. A blowable fibre optic member having no tensile strengthening component, said blowable fibre optic member comprising:

at least one optical fibre for conducting optical signals therealong; and means associated with said at least one optical fibre which increase the fluid drag created thereon by relatively moving gases in contact therewith so as to facilitate installation of said member into and along a substantially closed tubular conduit using primarily drag forces generated and distributed along the installed length of fibre member by said relatively moving gases.

* * * * *

(12) REEXAMINATION CERTIFICATE (4560th)
United States Patent
Reeve et al.

(10) Number: US 4,796,970 C1
(45) Certificate Issued: Apr. 30, 2002

(54) OPTICAL FIBRE TRANSMISSION LINES

(75) Inventors: Michael H. Reeve; Stephen A. Cassidy, both of Ipswich (GB)

(73) Assignee: British Telecommunications Public Limited Company

Reexamination Request:
No. 90/005,457, Aug. 18, 1999

Reexamination Certificate for:
Patent No.: 4,796,970
Issued: Jan. 10, 1989
Appl. No.: 07/015,113
Filed: Feb. 13, 1987

Related U.S. Application Data

(62) Division of application No. 06/848,950, filed on Apr. 7, 1986, now Pat. No. 4,691,896, which is a continuation of application No. 06/551,640, filed on Nov. 8, 1983.

(30) Foreign Application Priority Data

Nov. 8, 1982 (GB) ............................................. 8231840
Apr. 8, 1983 (GB) ............................................. 8309671

(51) Int. Cl.$^7$ ............................ G02B 6/44; G02B 6/00; G02B 6/04
(52) U.S. Cl. ........................ 385/109; 385/115; 385/147
(58) Field of Search ................................. 385/109, 147, 385/115

(56) References Cited

U.S. PATENT DOCUMENTS 2,515,953 A   7/1950   Dufresne
2,690,002 A   9/1954   Grenell (List continued on next page.)

FOREIGN PATENT DOCUMENTS

AU         214452         2/1957

(List continued on next page.)

OTHER PUBLICATIONS

"A Radically New Approach to the Installation of Optical Fibre using the Viscous Flow of Air", S.A. Cassidy et al, International Wire & Cable Symposium Proceedings, 1983, pp. 250–254.

(List continued on next page.)

*Primary Examiner*—Akm E. Ullah

(57) ABSTRACT

An optical fibre transmission line is installed by first installing a conduit having one or more bores and subsequently inserting flexible, lightweight optical fibre members containing the optical fibres into the bores.

The optical fibre members are propelled by employing the fluid drag of air, or another suitable gas, passed at high velocity through the bores.

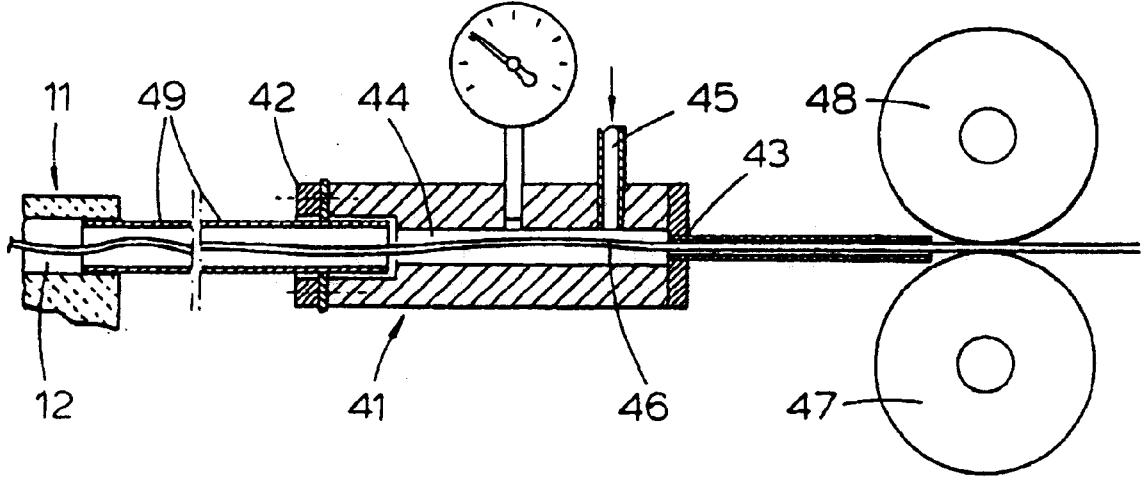

U.S. PATENT DOCUMENTS

| | | |
|---|---|---|
| 3,283,123 A | 11/1966 | Atkinson |
| 3,553,423 A | 1/1971 | Doxey |
| 3,654,114 A | 4/1972 | Brandstaetter |
| 4,087,748 A | 5/1978 | Pigeon |
| 4,520,531 A | 6/1985 | Hergeth |
| 4,558,308 A | 12/1985 | Ciordinik et al. |
| 4,644,791 A | 2/1987 | Sonoda |
| 4,702,404 A | 10/1987 | Einsle |
| 4,756,510 A | 7/1988 | Klamm |
| 4,850,569 A | 7/1989 | Griffioen et al. |
| 4,856,760 A | 8/1989 | Frost |
| 4,856,937 A | 8/1989 | Grocott |
| 4,934,662 A | 6/1990 | Griffioen et al. |
| 4,948,097 A | 8/1990 | Reeve |
| 4,953,827 A | 9/1990 | Araki |
| 4,997,256 A | 3/1991 | Sano |
| 5,090,665 A | 2/1992 | Walters |
| 5,169,126 A | 12/1992 | Reeve |
| 5,234,198 A | 8/1993 | Hale et al. |
| 5,456,450 A | 10/1995 | Reeve |
| 5,533,711 A | 7/1996 | Pickrell |
| 5,645,267 A | 7/1997 | Reeve |
| 5,664,765 A | 9/1997 | Pickrell |
| 5,677,974 A | 10/1997 | Elms et al. |
| 5,683,073 A | 11/1997 | Pickrell |
| 5,971,035 A | 10/1999 | Griffioen ............... 138/155 |

FOREIGN PATENT DOCUMENTS

| | | | |
|---|---|---|---|
| AU | 231245 | | 7/1958 |
| AU | 250437 | | 9/1960 |
| AU | 37076/68 | | 11/1969 |
| CH | 587575 | | 5/1977 |
| DE | 1130537 | | 3/1962 |
| DE | 1185312 | | 1/1965 |
| DE | 1209628 | | 1/1966 |
| DE | 1934818 | | 1/1971 |
| DE | 3045388 | | 2/1980 |
| DE | 3340972 | | 10/1985 |
| DE | 3409376 | | 12/1985 |
| EP | 0157610 | | 10/1985 |
| EP | 0 253 636 | | 1/1988 |
| EP | 0287225 | | 10/1988 |
| EP | 0318280 | | 5/1989 |
| EP | 0319194 | | 6/1989 |
| EP | 0323028 | | 7/1989 |
| EP | 0338856 | | 10/1989 |
| FR | 1179521 | | 5/1959 |
| FR | 2577724 | | 8/1986 |
| GB | 747706 | | 4/1956 |
| GB | 817938 | | 8/1959 |
| GB | B1479427 | * 7/1977 | ............. 385/109 |
| GB | 2060966 | | 5/1981 |
| GB | 2119949 | | 6/1983 |
| GB | 2157019 | | 10/1985 |
| GB | 2212940 | | 8/1989 |
| GB | 2212941 | | 8/1989 |
| GB | 2212942 | | 8/1989 |
| JP | 40-9353 | | 5/1965 |
| JP | 1976-15697 | | 7/1974 |
| JP | 1977-100994 | | 1/1976 |
| JP | 51-76592 | | 7/1976 |
| JP | 54-145181 | | 11/1979 |
| JP | 55-94157 | | 7/1980 |
| JP | 57-43005 | | 9/1982 |
| JP | 58-22516 | | 2/1983 |
| JP | 58-9359 | | 4/1983 |
| WO | 88/07693 | | 10/1988 |

OTHER PUBLICATIONS

"International Construction Utility Equipment Exposition 1979"; External Plant News; No. 54, Apr. 1980; pp 6–11; Note p. 8.

Plumettaz et al.; "Fiber–Optic Cable Installation Method"; 1993; pp 259–271.

Griffoen et al; "Blowing Optical Cables in the Netherlands"; The Ninth Annual European Fibre Optic Communications and Local Area Network Conference, Jun. 19–21, 1991; pp 83–86.

Griffioen; "The Installation of Conventional Fiber–Optic Cables in Conduits Using the Viscous Flow of Air"; Journal of Lightwave Technology, vol. 7, No. 2, Feb. 1989; pp 297–302.

Fee et al; A New Cable Pulling Friction Measurement Method and Results; IEEE/PES Transmission and Distribution Conference, Sep. 1991; pp 1–6.

Rifenburg; "Pipe–Line Design for Pipe–Type Feeders"; Transactions of the American Institute of Electrical Engineers; vol. 27; Dec. 1953; 1275–1288.

Griffioen; "A New Installation Method for Conventional Fiber Optic Cables in Conduits"; $37^{th}$ International Wire & Cable Symposium Proceedings; 1988; pp 172–178.

Kathiresan et al; "A Fiber–Optic Cable for Hostile Environments"; $41^{st}$ International Wire & Cable Symposium Proceedings; Nov. 16–19, 1992; pp 158–170.

Briggs et al; "The Use of the High Air–Speed Blown–Cable System for Placing Optical–Fiber Cables in Innerduct"; Post–1993; pp 179–189.

Fee et al; "Analysis and Measurement of Friction in High Speed Air Blowing Installation of Fiber Optic Cable"; National Fiber Optic Engineer Conference, Jun. 18–22, 1995; pp 502–513.

Asano; "Method of Introducing a Linear Body into a Winding Tube"; Sep. 1987; No. 4468; pp 1–4.

Hornung et al; "The Blown Fiber Cable"; IEEE Journal on Selected Areas in Communications; vol. SAC–4; No. 5; Aug. 1986; pp 679–685.

Cassidy et al; "A Radically New Apporach to the Installation of Optical Fibre using the Viscous Flow of Air"; Telecom Technol. J., vol. 2, Bi, Jan. 1, 1984, 4 pages.

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 20 and 22 is confirmed.

Claims 3, 9, 17 and 21 are cancelled.

Claims 1, 7, 14 and 19 are determined to be patentable as amended.

Claims 2, 4–6, 8, 10–13, 15, 16 and 18, dependent on an amended claim, are determined to be patentable.

New claims 23–27 are added and determined to be patentable.

1. An optical fibre cable structure of extended length L comprising:
   a conduit having one or more tubular ductlets of length L disposed therewithin and said ductlets having openings only at either end of said length L and being capable of loosely accommodating at least one optical fibre member, and
   at least one optical fibre member inserted into and through an associated ductlet by propelling the fibre member from one end to the other of said ductlet using fluid drag of a gaseous medium distributed along the inserted length of said fibre member, *wherein the fibre member comprises a plurality of optical fibres contained in a common envelope, and wherein the outer envelope has an outer surface textured or shaped to increase the fluid drag.*

7. An optical fiber cable structure of extended length L produced by the method of:
   advancing a lightweight and flexible optical fiber member into, along and through a tubular pathway of length L open substantially only at its opposite ends by propelling the fiber member along the pathway from one end to the other over said length L by fluid drag of a gaseous medium passed through the pathway in the desired direction of advance at a velocity substantially greater than the velocity at which said fibre member is moved therethrough, to provide a conduit having at least one tubular ductlet of length L forming said tubular pathway and loosely accommodating an optical fibre member contained therein, *wherein the fibre member comprises a plurality of optical fibres contained in a common envelope, and wherein the outer envelope has an outer surface textured or shaped to increase the fluid drag.*

14. An optical fibre member of extended length greater than L comprising one or more optical fibres contained in an outer envelope characterized in that said fibre member is sufficiently lightweight and flexible to be propellable from one end along and through a tubular pathway of length L substantially closed except at opposite ends thereof by fluid drag of a gaseous medium passing over the fibre member at a high average relative flow velocity, *wherein the outer envelope has an outer surface textured or shaped to increase the fluid drag.*

19. An optical fibre member extending a considerable distance between two points comprising one or more optical fibres contained in an outer envelope characterized in that said fibre member is sufficiently lightweight and flexible to be propellable along a tubular pathway by fluid drag of a gaseous medium passing over the fibre member at a high average relative flow velocity,
   said optical fibre member having a weight of not more than 3.5 gm/m, *wherein the outer envelope has an outer surface textured or shaped to increase the fluid drag.*

*23. An optical fibre cable structure as in claim 1, wherein said optical fibre member comprising a plurality of optical fibres contained in a common envelope has no tensile strengthening element.*

*24. An optical fibre member as in claim 20, wherein the outer envelope has an outer surface textured or shaped to increase the fluid drag.*

*25. An optical fibre member as in claim 20, having no tensile strengthening component.*

*26. A blowable fibre optic member as in claim 22, comprising a plurality of said optical fibres contained in a common envelope.*

*27. A blowable fibre optical member as in claim 26, wherein the common envelope has an outer surface textured or shaped to increase the fluid drag.*

\* \* \* \* \*